United States Patent
Subramanian et al.

(10) Patent No.: US 9,208,523 B2
(45) Date of Patent: Dec. 8, 2015

(54) LOW LATENCY FINANCIAL DATA NETWORK ARCHITECTURE

(75) Inventors: Krishnamurthy Subramanian, Mountain View, CA (US); Haresh Shah, Los Altos Hills, CA (US); Manash Kirtania, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 502 days.

(21) Appl. No.: 13/443,807

(22) Filed: Apr. 10, 2012

(65) Prior Publication Data

US 2012/0259761 A1    Oct. 11, 2012

Related U.S. Application Data

(60) Provisional application No. 61/474,033, filed on Apr. 11, 2011.

(51) Int. Cl.
| | |
|---|---|
| *H04L 12/54* | (2013.01) |
| *H04L 12/66* | (2006.01) |
| *G06Q 40/04* | (2012.01) |
| G06F 13/14 | (2006.01) |
| G06F 9/06 | (2006.01) |

(52) U.S. Cl.
CPC ............ *G06Q 40/04* (2013.01); *H04L 12/56* (2013.01); *H04L 12/66* (2013.01); *G06F 9/06* (2013.01); *G06F 13/14* (2013.01)

(58) Field of Classification Search
None
See application file for complete search history.

(56) References Cited

U.S. PATENT DOCUMENTS

| | | | |
|---|---|---|---|
| 2006/0149840 A1* | 7/2006 | Thompson et al. | 709/224 |
| 2006/0168380 A1* | 7/2006 | Benner et al. | 710/110 |
| 2007/0025351 A1* | 2/2007 | Cohen | 370/390 |
| 2008/0240150 A1* | 10/2008 | Dias et al. | 370/465 |
| 2010/0232448 A1* | 9/2010 | Sugumar et al. | 370/412 |
| 2010/0241758 A1* | 9/2010 | Oddie et al. | 709/231 |
| 2011/0178915 A1* | 7/2011 | Vinokour et al. | 705/37 |
| 2011/0225081 A1* | 9/2011 | Kittelsen et al. | 705/37 |

* cited by examiner

*Primary Examiner* — Kodzovi Acolatse
(74) *Attorney, Agent, or Firm* — Haynes and Boone, LLP

(57) ABSTRACT

A financial market data network having a lowered overall latency includes communication interfaces, specialized switches having internal switching fabric, and feed handlers that all facilitate communications between financial exchanges and consumers of financial market data therefrom. A feed handler is situated within or proximate a specialized switch and is arranged to receive raw financial market data directly from financial exchanges without the data first traveling through any switching fabric. The feed handler is adapted to process the received raw financial market data into a normalized format before the normalized financial market data is ever routed through any switching fabric, prior to being sent to consumers. The communication interfaces can include I/O ports located on the specialized switches, and the feed handlers can include one or more computer processors or servers. Additional internal switch components can include packet processors and storage components that store network protocols and/or layer tables.

20 Claims, 5 Drawing Sheets

LOW LATENCY FINANCIAL DATA NETWORK ARCHITECTURE

CROSS-REFERENCE TO RELATED APPLICATION

This application claims priority to U.S. Provisional Patent Application No. 61/474,033, filed Apr. 11, 2011, entitled "METHOD & APPARATUS FOR PROCESSING FINANCIAL MARKET DATA," which is incorporated by reference herein in its entirety and for all purposes.

TECHNICAL FIELD

The present invention relates generally to data communication networks, and more particularly to network architectures that involve the transmission of data from financial markets.

BACKGROUND

Financial market data includes information formally generated by a financial exchange that relates to quote and trade activity associated with various financial instruments handled by the financial exchange. Such financial instruments can include, for example, stocks, bonds, derivative products, mutual funds, fixed-income products, or any other financial products bought or sold on the financial exchange. Financial exchanges can include, for example, the New York Stock Exchange ("NYSE"), the NASDAQ Stock Market, and the Chicago Mercantile Exchange ("CME"), among many other financial exchanges.

Financial market data, or market data, typically includes numerous items of information, such as a ticker symbol, bid/ask price, bid/ask size, last price, quote time, exchange identity, and latest volume associated with the symbol, among other possible items. Raw market data generated by a financial exchange is typically placed into some format, and then transmitted by the exchange in a market data feed stream to vendors that collect market data feeds from multiple different financial exchanges. Each financial exchange typically places the market data into a format that is different from the formats of other financial exchanges. For example, a financial exchange in the U.K. might designate a certain symbol for the stock of a particular company, while a financial exchange in the U.S. might designate a different symbol for the same stock. As another example, the language used in the text of a data feed from one financial exchange may be different from the language used in the text of the data feed from another financial exchange. Numerous other significant differences between separate raw market data feeds are known to exist.

A financial services provider, often referred to as a vendor or aggregator, will typically subscribe to and receive financial market data in the form of direct feeds generated by multiple different financial exchanges. Financial services providers can include, for example, Reuters and Bloomberg, among others. Such financial services providers tend to use feed handlers, typically computer servers, that operate to receive, normalize, store, manage and integrate the financial market data received from the multiple exchange feeds. Normalization in this context means that the various formats used by the different financial exchanges to send out their market data feeds are all converted to a single format, such that the data can be more easily used and consumed by a downstream financial institution. The feed handlers will then provide this substantially processed financial data to downstream financial institutions and consumers, such as brokerages.

High frequency trading ("HFT") refers to certain kinds of financial instrument trading strategies that are characterized by very short transaction times and very short holding periods. Financial institutions running HFT strategies typically implement their strategies on high-speed and highly available computers running on a financial network. The high-speed computers of these financial institutions can often be connected over a financial network directly to the feed handlers of one or more financial services providers and/or directly to one or more market data feeds coming from one or more financial exchanges themselves. In order to execute a HFT strategy well, the overall period of time from receipt of the market data to the execution of a trade is of critical importance. This period of time is often heavily influenced by the length of time it takes for communications to transpire across the network, which is typically referred to as "network latency."

In order to minimize network latency, vendor feed handling equipment, typically in the form of computer server(s), is generally located as close as possible to the equipment operated by each financial exchange that generates the market data. As more and more vendors (i.e., financial services providers) jockey to locate their own equipment within the limited and finite amount of physical space proximate the equipment of the actual financial exchanges, such prime space becomes increasingly costly and ultimately unavailable.

One solution to this network latency problem can be for a brokerage or other downstream financial institution to subscribe to raw market data feeds directly and to implement its own feed handler functionality on its own high-speed trading platform. While such arrangements can indeed reduce network latency and the overall period of time from receipt of market data to trade execution, the additional costs and complexities can be substantial. Unfortunately, such solutions can require subscribing to many raw market data feeds, as well as implementing and maintaining separately owned systems with feed handlers to process the multiple feeds. As an alternative to the cost and complexity of maintaining their own feed handlers then, many brokerages and other downstream financial institutions outsource this function to the financial services vendors, thus accepting the network latency problems.

Although many systems and methods for conducting market transactions on a financial market network have generally worked well in the past, there is always a desire for improvement. In particular, what is desired are financial data network systems and methods that allow for the communication of financial market data and the execution of market trades with reduced levels of network latency.

SUMMARY

It can be an advantage of the present invention to provide improved financial data network systems and methods that allow for the communication of financial market data and the execution of market trades with reduced levels of network latency. Such improved systems and methods preferably result in better efficiencies and outcomes for consumers running HFT strategies. In particular, the various systems and methods provided herein can involve relocating an individual feed handler to be within or even before the initial switch in the communications data path from the financial exchange to the downstream consumer. In such arrangements, the latency injected into a financial network by maintaining a separate feed handler to process market data feeds is reduced by implementing feed handler functionality on a switch that directly receives the market data feed from a financial exchange and sends the processed feed directly to a financial customer or other institution.

In various embodiments of the present invention, a financial market data network or system can include initial and secondary communication interfaces, a specialized switch situated between the initial and secondary communication interfaces, and at least one feed handler situated within or proximate the specialized switch. One or more of the initial communication interfaces can be adapted to facilitate communications between the network and one or more external financial exchanges that provide raw financial market data, while one or more of the secondary communication interfaces can be adapted to facilitate communications between the network and one or more external consumers of the raw financial market data provided by the one or more external financial exchanges. The specialized switch can include switching fabric that is adapted to facilitate communications between the external financial exchange(s) and the external consumer(s), and at least one feed handler can be arranged to receive raw financial market data directly from the one or more external financial exchanges without the received raw financial market data first traveling through any switching fabric or high latency network components. Further, the feed handler(s), which can be one or more computer processors, can be adapted to process the received raw financial market data, such as into a normalized format, before the financial market data is sent to the one or more external consumers.

In various detailed embodiments, the normalized financial market data can be suitable for use by the external consumer(s) without further processing of the financial market data. In addition, the initial communication interface(s) and/or the secondary communication interface(s) can include a plurality of I/O ports located on the specialized switch itself. In some embodiments, the feed handler is situated within the specialized switch itself, and is arranged to receive raw financial market data that has passed through at least one of the plurality of I/O ports. In some embodiments, the feed handler is situated proximate the specialized switch and is arranged to receive and process the raw financial market data prior to the financial market data passing through any of the plurality of I/O ports. In some embodiments, the overall latency in providing normalized financial market data to the consumer(s) that is converted from the raw financial market data from the financial exchange(s) is significantly lower than the overall latency of a financial market data network that utilizes a switching fabric between the financial exchange(s) and a feed handler.

In various further embodiments, a financial market data network switch can include a plurality of I/O ports adapted to receive and send financial market data over a financial market data network, a switching fabric situated within the switch and adapted to route financial market data communications within the switch and between various ports from the plurality of I/O ports, and a feed handler situated within the switch and arranged to receive the raw financial market data directly from the external financial exchange without the received raw financial market data first traveling through the switching fabric. At least a portion of the plurality of I/O ports can be adapted for direct communications with an external financial exchange that provides raw financial market data. Further, the feed handler can be arranged to process the received raw financial market data into a normalized format before the financial market data is sent through the switching fabric.

In various detailed embodiments, the switch can also include one or more packet processors adapted to receive the normalized financial market data from the feed handler and facilitate the routing and sending of the normalized financial market data through the switching fabric. In some embodiments, the switch can further include one or more storage components adapted to hold information that facilitates the proper routing of normalized financial market data through the switching fabric. Such information held in the storage component(s) can include one or more network protocols and/or one or more layer tables, for example.

In further embodiments, various methods of providing communications over a financial market data network are disclosed. Such methods can involve any of the foregoing network systems or devices, such as the specialized switch above. In particular, such methods can include the process steps of receiving a raw financial market data feed directly from an external financial exchange without the raw financial market data feed first traveling through any switching fabric, processing data from the raw financial market data feed into a normalized format before the financial market data is sent through any switching fabric, routing the normalized financial market data through a switching fabric after the processing step, and delivering the normalized financial market data to the one or more external consumers. In various embodiments, the financial market data normalized by the processing step can be suitable for use by one or more external consumers without further processing of the financial market data.

In some detailed embodiments, the receiving and processing steps are performed on a feed handler prior to the financial market data ever arriving at a network switch. In other detailed embodiments, the feed handler performing the receiving and processing steps can be located within a specialized switch. Again, the overall latency in providing normalized financial market data to the consumer(s) can be significantly lower than the overall latency of a financial market data network that utilizes a switching fabric between the financial exchange and a feed handler. In some detailed embodiments, additional process steps can include accepting a high frequency trading command from one of the external consumers based upon the delivered normalized financial market data, and then forwarding the high frequency trading command to the external financial exchange.

Other apparatuses, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and arrangements for the disclosed inventive low latency financial data network devices, systems and methods. These drawings in no way limit any changes in form and detail that may be made to the invention by one skilled in the art without departing from the spirit and scope of the invention.

DETAILED DESCRIPTION

Exemplary applications of apparatuses and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following examples should not be taken as limiting.

In the following detailed description, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used, and changes may be made without departing from the spirit and scope of the invention.

The present invention relates in various embodiments to devices, systems and methods involving the communication of financial market data and the execution of market trades with reduced levels of network latency. Such devices, systems and methods can result in better efficiencies and outcomes for consumers running HFT strategies with respect to financial markets, for example. In some embodiments, one or more feed handlers can be located within or even before an initial specialized switch or router in the communications data path from the financial exchange to the downstream consumer, such that raw financial market data can be processed and normalized within, or even before reaching, the switch itself. In this manner, the financial market data that exits the initial switch or router in the first instance is actually normalized financial market data that is ready for brokerages and other downstream consumers.

While the various examples disclosed herein focus on particular aspects of financial market data network architectures, parties and procedures, it will be understood that the various inventive principles and embodiments disclosed herein can be applied to other data network architectures, arrangements and communications as well. For example, an electronic news or media network that utilizes raw data feeds that are sent through network switches or routers, are processed and normalized, and then sent back through network switches or routers before being sent to downstream consumers might similarly benefit from the use of the various specialized switches, network arrangements and methods disclosed herein.

Figure 1:
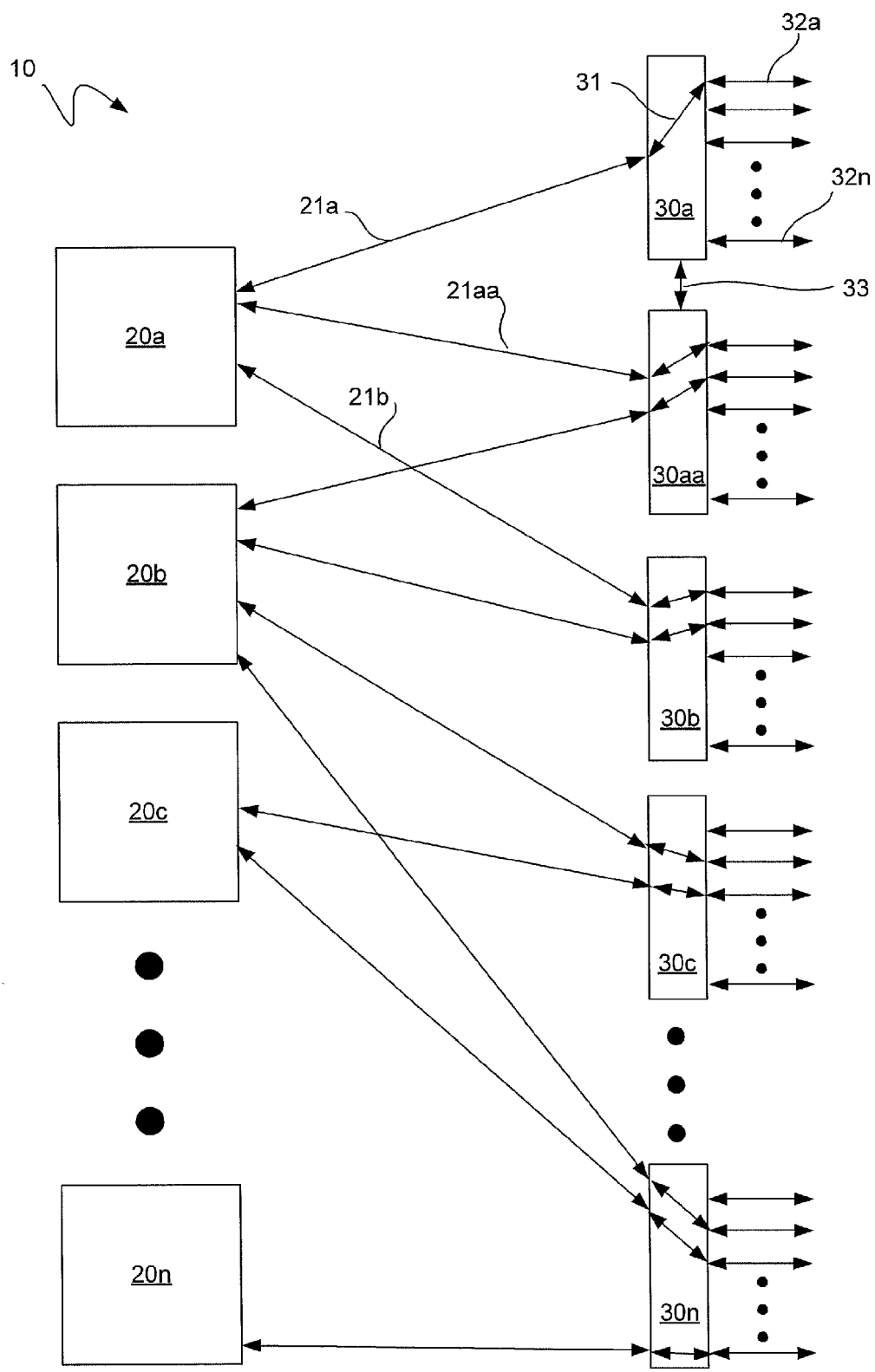
FIG. 1 illustrates in block diagram format the front end of an exemplary financial market data network including multiple financial exchanges and multiple switches that facilitate communications therefrom.

Referring first to FIG. 1, the front end of an exemplary financial market data network including multiple financial exchanges and multiple switches that facilitate communications therefrom is illustrated in block diagram format. Financial market data network 10 can include any number of separate financial exchanges 20a through 20n that each communicate with one, some, many or all of a number of communication switches 30ai through 30n, from which financial market data is then relayed to other downstream components and consumers (not shown). Although only four financial exchanges 20a, 20b, 20c, 20n are shown, it will be readily appreciated that any given network 10 can include one, two or any other number of financial exchanges. As actual entities, for example, financial exchange 20a could be the NYSE, financial exchange 20b could be the NASDAQ, financial exchange 20c could be the CME, and so forth. Of course, numerous other arrangements involving these and/or other financial exchanges are also possible.

Each financial exchange 20i can have numerous data feeds 21i emanating therefrom to numerous different network communication switches 30i. For example, financial exchange 20a can have raw financial market data feed 21a going to switch 30a, another data feed 21aa going to switch 30aa, and yet another data feed 21b going to switch 30b, among numerous other possible individual data feeds, which are not shown for purposes of simplicity in illustration. In many instances, some or all of these separate data feeds 21a, 21aa, 21b can be identical, such that vital financial market data can be transmitted as quickly and as fairly as possible to many different downstream components and consumers. In addition, each switch 30i can receive a single data feed, or data feeds from multiple different financial exchanges. The various switches 30i can then route data along internal paths 31 (i.e., switch fabric) to relay data appropriately to external communication lines 32a through 32n that extend to various downstream feed handlers, consumers and other components and parties (not shown), as set forth in greater detail below.

In some cases, multiple switches can be owned or operated by the same party for purposes of redundancy and high availability in the event of network issues. For example, switches 30a and 30aa can be redundant switches operated by the same party, such that both switches receive identical raw financial market data feeds 21a and 21aa respectively from financial exchange 20a. Switches 30a and 30aa can be configured to communicate with each other via path 33, such as where one data feed or path or switch portion fails or is having latency or other issues, such that potentially affected downstream components and consumers can still receive data from and communicate with financial exchange 20a.

Figure 2A:
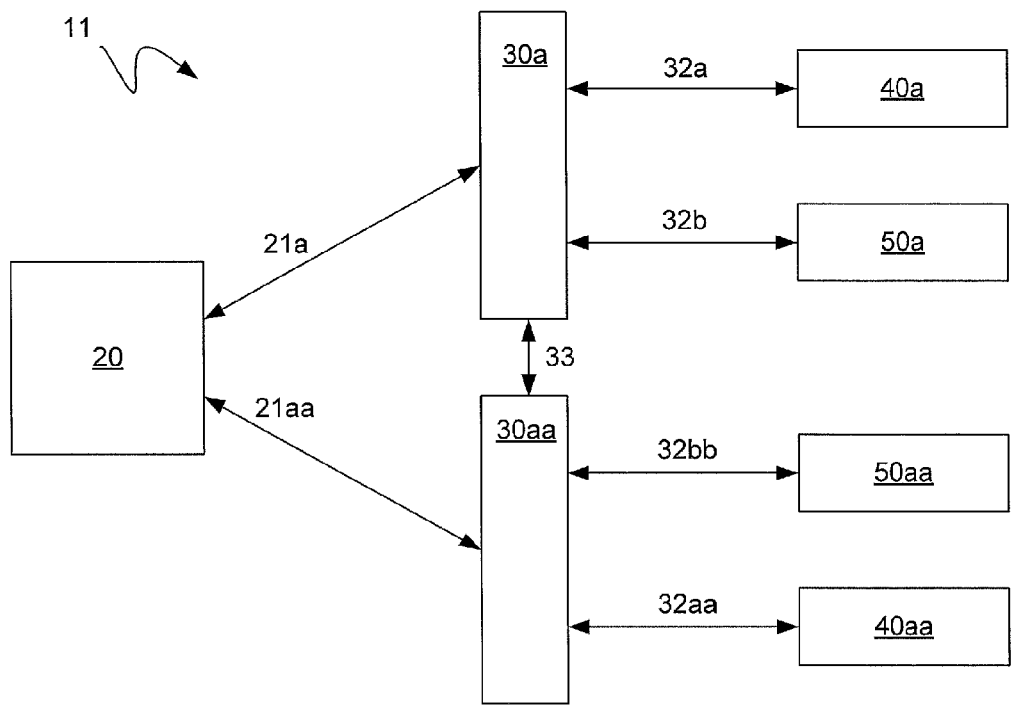
FIG. 2A illustrates in block diagram format an exemplary extended layout for a portion of the exemplary financial market data network of FIG. 1.

Continuing with FIG. 2A, an exemplary extended layout for a portion of the financial market data network of FIG. 1 is also shown in block diagram format. FIG. 2A depicts an arrangement 11 that includes data center equipment running under the control of an exemplary financial exchange 20 connected over network equipment (e.g., switches 30) to vendor feed handlers 40 and to financial institutions or other consumers 50. Although a single financial exchange 20 and single commonly operated pair of redundant switches 30a, 30aa are shown for purposes of simplicity in illustration, it will be readily appreciated that the same or similar arrangements can propagate across a complex network involving multiple financial exchanges and many more network switches. Further, not all switches need to be operated in redundancy arrangements.

As an example, financial exchange 20 can create and transmit two separate raw financial market data feeds, shown in FIG. 2A as feed 21a and feed 21aa. Each feed can contain the same information, and the two feeds are sent to provide customers (e.g., vendors and financial institutions) with redundant streams of information. Again, such redundancy is not necessary, but is often applied so that in the event one stream fails, is corrupted or is otherwise disrupted, the downstream vendors and consumers can continue to receive the other raw financial market data stream. Each of the redundant streams of raw financial market data can be sent to two different sets of network equipment, represented as switch 30i and switch 30ii. Each switch 30i, 30ii can receive the raw financial market data streams 21a, 21aa from the financial exchange 20 and send the financial market data feed to one or more feed handlers 40a, 40aa, such as along communication paths 32a and 32aa respectively. Each feed handler 40a, 40aa processes its financial market data feed in some manner and sends the processed financial market data feed information to one or more consumers 50a, 50aa, such as back through the respective switch and along communication paths 32b and 32bb respectively.

Figure 2B:
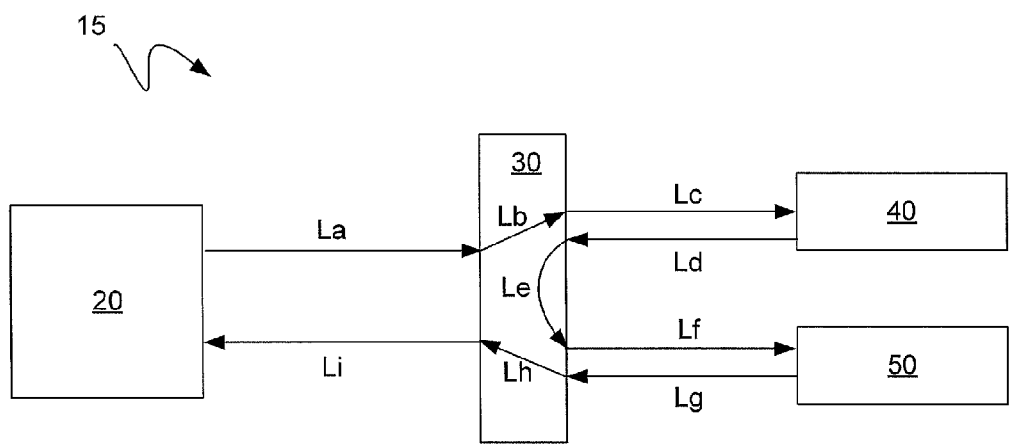
FIG. 2B illustrates in block diagram format an exemplary travel path for communications involving a data feed and resulting trade over a portion of the exemplary financial market data network shown in FIG. 2A.

FIG. 2B illustrates in block diagram format an exemplary travel path 15 for communications involving a particular data feed and resulting trade over a portion of the exemplary financial market data network shown in FIG. 2A. As shown, a raw financial market data feed originates at financial exchange 20 and is communicated to network switch 30 along a communication path having a given latency La. This raw financial market data feed is then routed through switch fabric within switch 30 to exit the switch at an appropriate output port, with the latency of this process being designated as Lb. The raw financial market data feed then travels from switch 30 to feed handler 40 along a path having latency Lc. The feed handler 40 then processes and normalizes the raw data and sends this normalized financial market data back to the switch 30 along a communication path having latency Ld. The switch 30 routes this normalized data through an internal switching fabric to an appropriate output port again, which involves yet another latency Le. The normalized financial market data is then communicated to a consumer 50, which involves latency Lf.

In the event that the consumer 50 wishes to process and act upon the received normalized financial market data, a trade order or command can be generated thereby. Such a trade command is communicated back to the switch 30, involving latency Lg. This trade command is routed through an internal switching fabric within switch 30, which involves latency Lh, and is then forwarded from the switch to the financial exchange, which involves latency Li. The overall latency or time then for the consumer 50 to receive the normalized financial market data can be represented as:

$$La+Lb+Lc+Ld+Le+Lf \quad (1)$$

while the overall latency or time for the process of a consumer receiving the financial market data and communicating a trade command back to the financial exchange 20 can be represented as:

$$La+Lb+Lc+Ld+Le+Lf+Lg+Lh+Li \quad (2)$$

While each of these latency portions and even their overall sums are typically quite short in time, such as on the order of microseconds or even fractions of microseconds, these tiny amounts of latency or time can be significant in some contexts. Such contexts can include, for example, that of a consumer using an HFT strategy. As such, the ability to shorten or eliminate any portion of this overall latency or time would be advantageous.

Figure 3A:
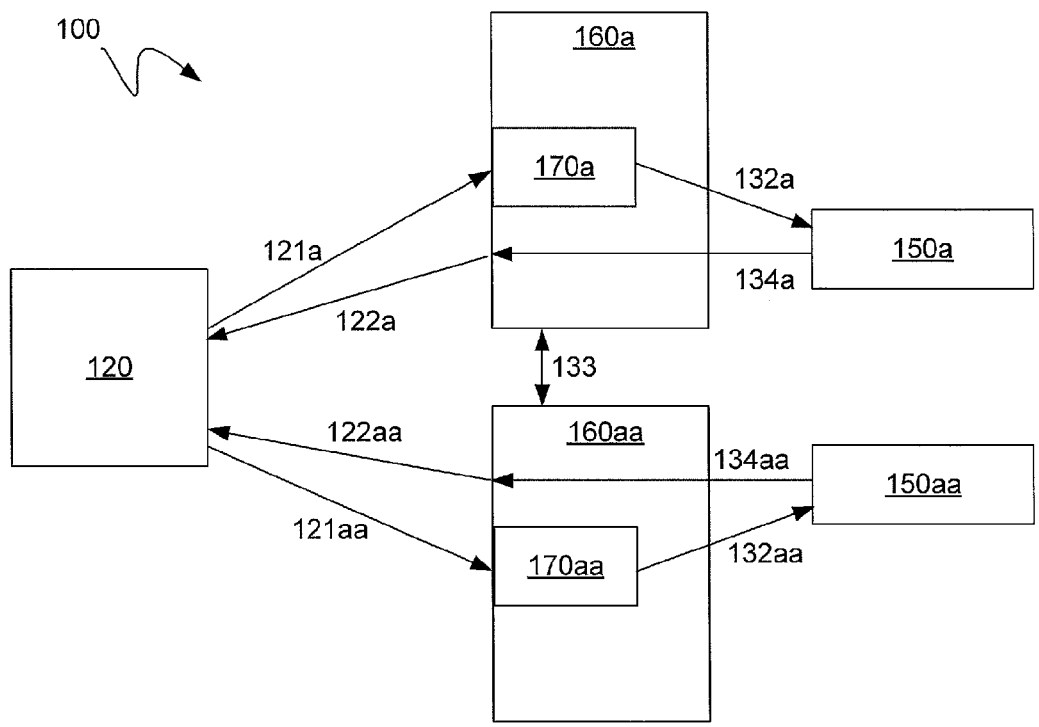
FIG. 3A illustrates in block diagram format the partial layout of an exemplary financial market data network having a specialized feed handling switch according to one embodiment of the present invention.

Turning next to FIG. 3A, a partial layout of an exemplary financial market data network having a specialized feed handling switch according to one embodiment of the present invention is similarly shown in block diagram format. Financial market data network 100 can be similar in some regards to network 10 above, in that it can include any number of separate financial exchanges 120 that each communicate along communication paths 121a, 122a, 121aa, 122aa with one, many or all of a number of switches 160a, 160aa. Data from switches 160a, 160aa is then relayed to other downstream components and consumers 150a, 150aa along communication paths 132a, 132aa, and communication back to the switches can be along these or other suitable paths 134a, 134aa. Again, although only one financial exchange 120, a single pair of redundant switches 160a, 160aa, and two consumers 150a, 150aa are shown, it will be readily appreciated that any given network 100 can include one, two or any other number of financial exchanges, switches and consumers. Furthermore, not all switches need be redundant in nature, and each switch can be arranged to communicate with multiple financial exchanges and/or multiple consumers.

Unlike network 10 above, however, financial market data network 100 can include one or more specialized switches 160a, 160aa, each of which is arranged to process raw financial market data in a manner similar to that of a feed handler maintained by a downstream vendor (e.g., item 40a in FIG. 2A). This can be accomplished, for example, by situating a feed handler 170a or other similar device within the specialized switch 160a itself. In various embodiments, the internal switch feed handler 170a can be arranged to receive raw financial market data directly from a financial exchange 120 prior to the raw data ever passing through any switch fabric. The feed handler 170a could then process and normalize the raw data before it is routed through the switch fabric internal to switch 160a, and this normalized data is then sent to the consumer 150a. As will be understood, the same or similar arrangements can be had for other switches, such as for redundant switch 160aa having feed handler 170aa and consumer 150aa. Again, a communication path 133 can couple redundant or logically stacked switches 160a and 160aa, such that, for example, consumer 150aa can receive raw data feed 121a in some instances. As in the foregoing example, not all such specialized switches need to be redundant or logically stacked in nature.

Typically, each specialized switch 160a, 160aa can include one or more layer-2 protocols that are needed to build and maintain layer-2 switching tables that are local to the switch. Information in the switching tables can then be used to route the normalized financial market data through the internal switching fabric and thus distribute the normalized data to the consumers. As will be readily appreciated, each specialized switch 160a, 160aa can also include Internet Protocol ("IP") multicast functionality that operates to replicate the processed and normalized financial market data for distribution to two or more consumers.

Figure 3B:
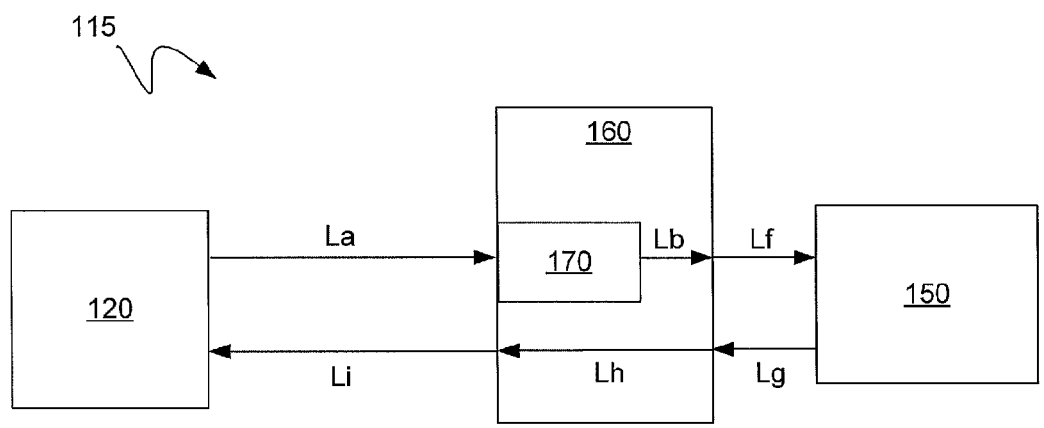
FIG. 3B illustrates in block diagram format an exemplary travel path for communications involving a financial market data feed and resulting trade over a portion of the exemplary financial market data network shown in FIG. 3A according to one embodiment of the present invention.

Moving to FIG. 3B, an exemplary travel path 115 for communications involving a financial market data feed and resulting trade over a portion of the exemplary financial market data network shown in FIG. 3A is similarly shown in block diagram format. Similar to the previous example, a raw financial market data feed originates at financial exchange 120 and is communicated to specialized network switch 160 along a communication path having a given latency La. The raw financial market data feed can be received directly by feed handler 170 within switch 160, prior to the raw data traveling through any switching fabric. The internal feed handler 170 processes and normalizes the raw financial market data, and then routes this normalized financial market data through switch fabric within specialized switch 160 to exit the switch at an appropriate output port, with the latency of this routing process being designated as Lb. The normalized financial market data is then communicated to a consumer 150, which involves latency Lf.

For travel path 115 in this particular embodiment, the overall latency or time then for the consumer 150 to receive the normalized financial market data does not include latencies Lc, Ld or Le, and as such can be represented simply as:

$$La+Lb+Lf \quad (3)$$

Similar to the foregoing example, the consumer 150 may wish to process and act upon the received normalized financial market data, such that a trade order or command can be generated thereby. Similarly then, such a trade order or command is communicated from the consumer 150 back to the switch 160, involving latency Lg. This trade command is routed through an internal switching fabric within switch 160, which involves latency Lh, and is then forwarded from the switch 160 to the financial exchange 120, which involves latency Li. As such, the overall latency or time in this particular embodiment for the process of a consumer 150 receiving the financial market data and communicating a trade command back to the financial exchange 120 can be represented as:

$$La+Lb+Lf+Lg+Lh+Li \quad (4)$$

While each of these latency portions might not represent exactly its counterpart from network 10 above, corresponding portions are relatively analogous for purposes of measuring latencies and times. Importantly, the overall latency in providing normalized financial market data to a consumer that is converted from the raw financial market data from a financial exchange in this network arrangement does not include portions Lc, Ld or Le, and as such is significantly lower than the overall latency of a financial market data network that utilizes a switching fabric between the financial exchange and feed handler. This significantly reduced overall latency can be advantageous for those running HFT strategies in particular.

Figure 3C:
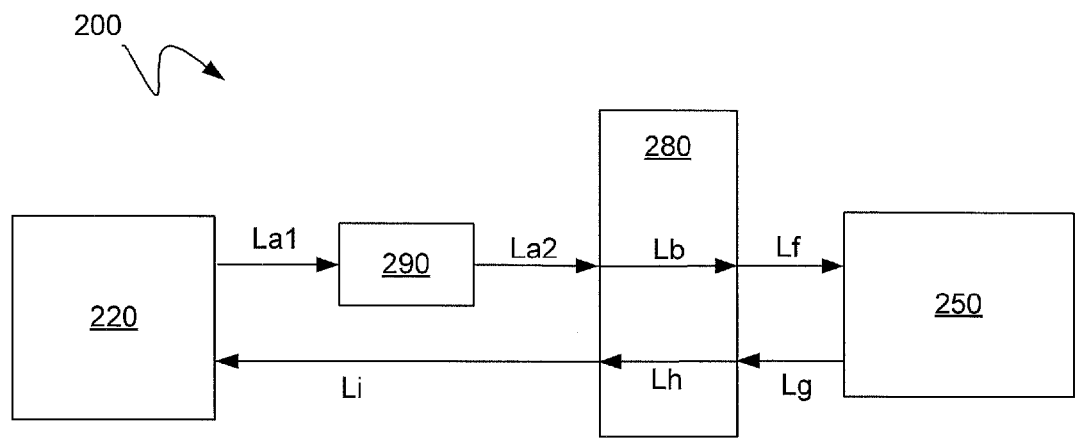
FIG. 3C illustrates in block diagram format the partial layout of an alternative financial market data network having a specialized feed handling switch, as well as an exemplary communications travel path therefor according to one embodiment of the present invention.

Continuing with FIG. 3C, a block diagram is provided of a partial layout for an alternative financial data network having a specialized feed handling switch, as well as an exemplary communications travel path therefor. As in the foregoing examples, financial market data network 200 is shown in simplified form for purposes of illustration and discussion, and it will be understood that many more financial exchanges, switches, and consumers can be also present across the network. Financial market data network 200 is similar to network 100 above, except that the feed handler 290 or similar component is located outside the switch and situated between the financial exchange 220 and the network switch 280. This arrangement still involves the raw financial market data feed from the financial exchange 220 being received directly by the feed handler 290 and processed thereby prior to the data traveling through any switch fabric.

The processed and normalized data from the feed handler 290 is then sent to switch 280, where it is routed and directed toward the various downstream consumers 250. As in the foregoing examples, although a switch redundancy is not shown in network 200, it will be understood that such an arrangement can be readily included. Similar to network 100 above, the arrangement of network 200 results in an overall significantly reduced latency or time for the process of a consumer 250 receiving the financial market data and communicating a trade command back to the financial exchange 220, which latency or time can be represented as:

$$La1+La2+Lb+Lf+Lg+Lh+Li \quad (5)$$

where La1 represents the latency or time from the financial exchange 220 to the feed handler 290, and where La2 represents the latency or time, if any, from the feed handler to the switch 280.

Figure 4:
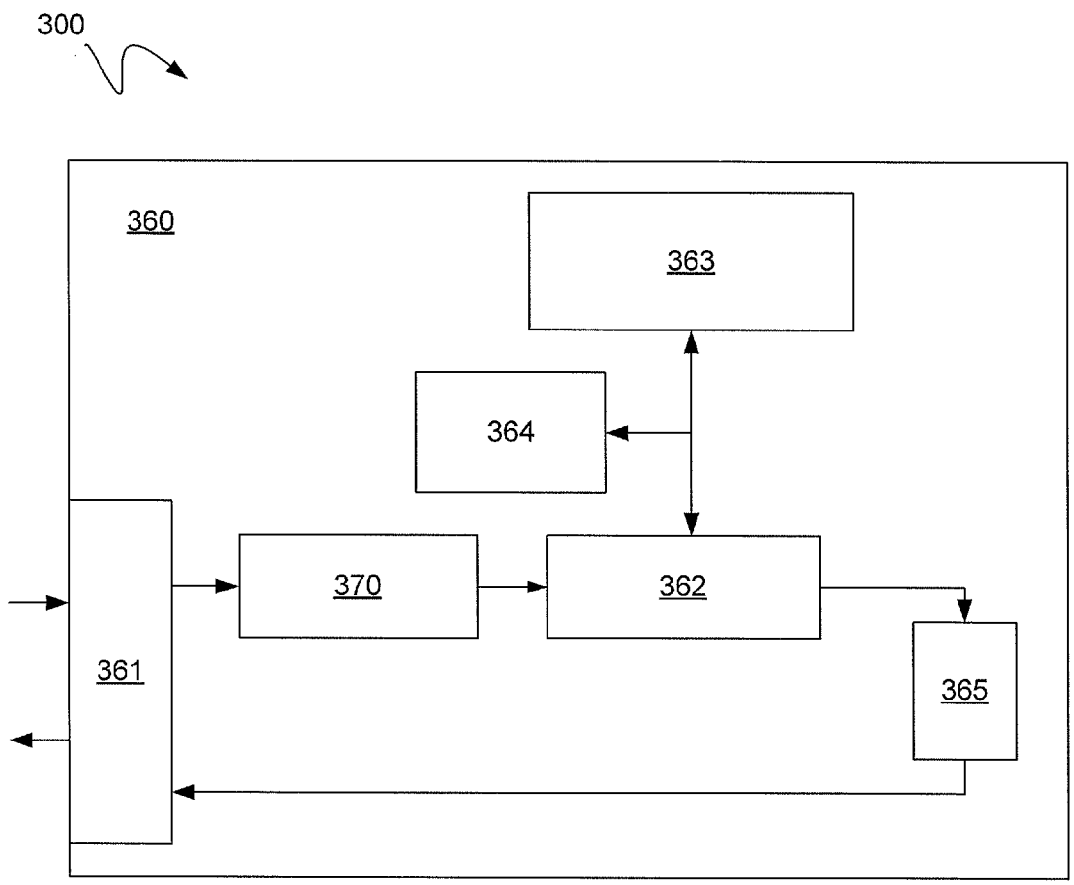
FIG. 4 illustrates in block diagram format an exemplary layout for a specialized feed handling switch, such as the switch of FIG. 3A, according to one embodiment of the present invention.

FIG. 4 illustrates in block diagram format an exemplary layout for a specialized feed handling switch, such as the switch of FIG. 3A, according to one embodiment of the present invention. In general, financial market data network arrangement 300 can include a specialized switch 360 situated therein, where such a specialized switch is arranged to receive and process a raw financial market data feed and to switch/forward the processed data to one or more consumers. The specialized switch 360 can be comprised of a plurality of input/output ("I/O") ports 361, a feed handler 370 or other system component having feed handler functionality, a packet processor 362 or other system component having packet processing functionality, one or more storage components 363, 364 adapted to hold pertinent switching or network information, and a switching fabric 365. Information held in the one or more storage components can include, for example, one or more network protocols 363, and one or more layer-2 or layer-3 tables 364, among other possible items.

The I/O ports 361 can serve as the interface(s) of specialized switch 360 to the various physical network links. In various embodiments, I/O ports 361 can include one or more initial communication interfaces adapted to facilitate communications with one or more financial exchanges that provide raw financial market data. I/O ports 361 can also include one or more secondary communication interfaces adapted to facilitate communications with one or more consumers of the raw financial market data provided by the financial exchange (s). Unprocessed raw financial market data received by specialized switch 360 from one or more financial exchanges can be passed to the feed handler 370 or other internal switch component that is responsible for normalizing the raw financial market data. In addition to normalizing the raw financial market data, this information can be processed in other ways depending upon the particular needs of a consumer or class of consumers.

The feed handler 370 or other similar internal switch component can be implemented in a variety of ways, such as in firmware, on a programmable processing device, on a custom processing device, or on a miniature server, among other possible solutions. Feed handler 370 can be preprogrammed according to one or more desired normalization formats, and can also be adapted to be updated or reprogrammed over time, such as where new or revised formats are desired, or where new types of data are added to the overall financial market data network. For example, the adding or deletion of new stocks and designators and values therefor from time to time can result in a need to update formats, tables and/or values within feed handler 370. In some embodiments, such reprogramming or updating can be accomplished as part of a remote downloading and updating process, as will be readily appreciated.

The packet processor 362 can be implemented in the same processing device as the feed handler 370 or this can be done on a different device within the specialized switch 360. After processing by the feed handler 370 or other similar component, the processed or normalized financial market data is sent to the packet processor 362, which can operate using information maintained in the various tables and protocols on storage components 363, 364 to determine the correct next hop, or next hops for routing the data, and whether the data is scheduled for distribution to more than one consumer. After being operated on by the packet processor 362, the processed or normalized financial market data is then sent to the switch fabric 365, where it is scheduled to be switched to an egress port for transmission to a consumer.

As noted above, one benefit of incorporating the financial market data feed handler functionality within or even before the initial switch itself is to reduce the overall latency between the time that the original raw financial market data feed is generated and sent out by a financial exchange and the time that the normalized or otherwise processed financial market data arrives at a consumer site ready for use. In such embodiments, latency is reduced by positioning the feed handler or a similar processing component such that the raw financial market feed is processed prior to the data being operated on by the packet processor and prior the data to being propagated through the switch fabric.

Figure 5:
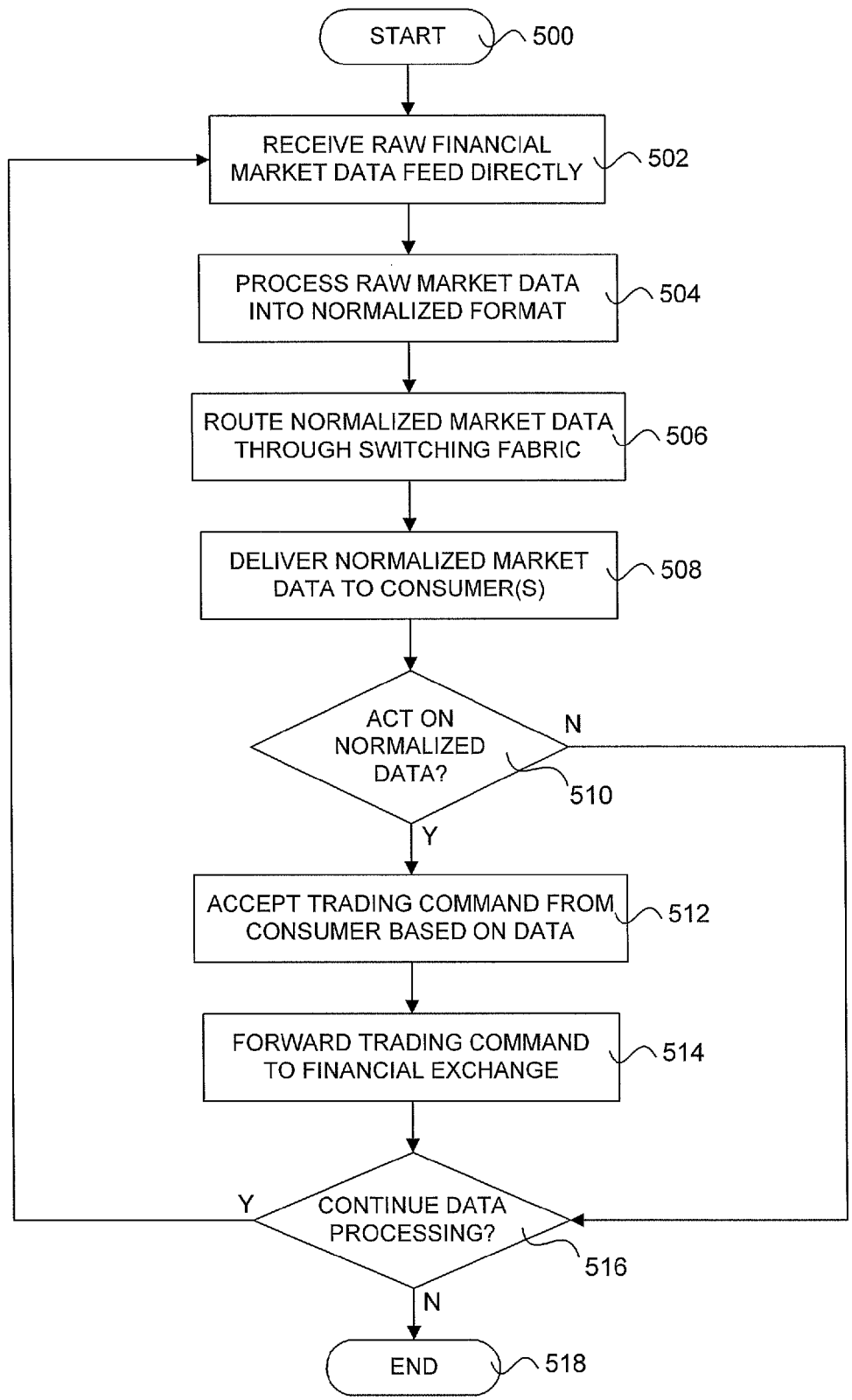
FIG. 5 provides a flowchart of an exemplary method of providing communications over a financial market data network according to one embodiment of the present invention.

Although a wide variety of applications and processes involving low latency data network architectures can be envisioned, one basic method is provided here as an example. Turning lastly to FIG. 5, a flowchart of an exemplary method of providing communications over a financial market data network is illustrated. In particular, such a method can involve using or operating a specialized financial market data network, such as might involve any of the various specialized switch or feed handler components, devices, systems and arrangements described above. It will be readily appreciated that not every method step set forth in this flowchart is always necessary, and that further steps not set forth herein may also be included. For example, step 506 might not be required in all implementations, and other embodiments might include one or more steps directed toward redundancies in commonly operated multiple switch arrangements. As another example, further steps related to collecting raw data from multiple different financial exchanges, normalizing each raw data feed and acting upon these multiple normalized sets of data can also be added. Furthermore, the exact order of steps may be altered as desired for various applications.

Beginning with a start step 500, a raw financial market data feed is received directly at process step 502. Such receipt can be at a feed handler or other similar component, which may be located within a specialized switch, and this receipt can occur prior to the raw financial market data encountering any switching fabric along the communications network. The feed handler or other similar component can then process the raw financial market data at process step 504, such as by putting the data into a normalized format. The normalized financial market data can then be routed through switching fabric within a specialized switch at process step 506, after which the normalized data is delivered to one or more consumers at process step 508.

At a subsequent decision step 510, and inquiry is made as to whether the provided normalized data is to be acted upon. If not, then the method jumps to decision step 516. If the normalized financial market data is to be acted upon, however, then the method continues to process step 512, where a trading command based on the normalized data from the consumer is accepted. The method then moves to process step 514, where the trading command is relayed or forwarded to the financial exchange, presumably for action by that entity. After process step 514, the method continues to decision step 516, where an inquiry is made as to whether further processing of financial market data is to continue. If so, then the method reverts to process step 502, whereby the entire method is then repeated.

In the event that no further financial market data processing is desired at decision step 516, however, then the method proceeds to finish at and end step 518. It will be readily appreciated that some or all of the steps shown in FIG. 5 can be performed by certain subset(s) of the overall financial market data network. For example, each of steps 500-518 can be performed within specialized switch 360 having an internal feed handler 370 above. In other embodiments where the feed handler is external to the specialized switch, such as in the arrangement shown in FIG. 3C above, then each of steps 500-518 can be performed by the combination of switch 280 and feed handler 290, for example. Further steps not depicted can include, for example, rerouting communications within redundant paths where certain paths fail or lag. Other steps can include, for example, receiving and normalizing second, third and additional raw data feeds, as may be desired.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Various changes and modifications may be practiced, and it is understood that the invention is not to be limited by the foregoing details, but rather is to be defined by the scope of the claims.

What is claimed is:

1. A financial market data network, comprising:
one or more initial communication interfaces adapted to facilitate communications between the network and one or more external financial exchanges that provide raw financial market data;
one or more secondary communication interfaces adapted to facilitate communications between the network and one or more external consumers of the raw financial market data provided by the one or more external financial exchanges;
a first specialized switch situated between at least one of the initial communication interfaces and at least one of the secondary communication interfaces, wherein said first specialized switch includes a first switching fabric that is adapted to facilitate communications between the one or more external financial exchanges and the one or more external consumers;
a first processor within the first specialized switch, the first processor being configured to:
receive raw financial market data directly from the one or more external financial exchanges without the received raw financial market data first traveling through the first switching fabric;
process the received raw financial market data into a normalized format before the financial market data is sent through the first switching fabric;
route and send the normalized financial market data through the first switching fabric; and
when the normalized data is acted upon:
receive a trade command based on the normalized financial market data;
route the trade command through the first switching fabric; and
forward the trade command to the one or more external financial exchanges without the trade command undergoing further processing within the first specialized switch;

a second specialized switch situated between at least one of the initial communication interfaces and at least one of the secondary communication interfaces, wherein said second specialized switch includes a second switching fabric that is adapted to facilitate communications between the one or more external financial exchanges and the one or more external consumers;

a second processor within the second specialized switch, the second processor being configured to:
receive second raw financial market data directly from the one or more external financial exchanges without the received second raw financial market data first traveling through the second switching fabric;
process the received second raw financial market data into the normalized format before the second financial market data is sent through the second switching fabric;
route and send the normalized second financial market data through the second switching fabric; and
when the second normalized data is acted upon:
receive a second trade command based on the normalized financial market data;
route the second trade command through the second switching fabric; and
forward the second trade command to the one or more external financial exchanges without the second trade command undergoing further processing within the second specialized switch;
wherein the first and second specialized switches are a pair of redundant specialized switches.

2. The financial market data network of claim 1, wherein the normalized financial market data is suitable for use by the one or more external consumers without further processing of the financial market data.

3. The financial market data network of claim 1, wherein said one or more initial communication interfaces, said one or more secondary communication interfaces, or any combination thereof, comprise a plurality of I/O ports located on the first specialized switch.

4. The financial market data network of claim 3, wherein said first processor is arranged to receive raw financial market data that has passed through at least one of the plurality of I/O ports.

5. The financial market data network of claim 1, wherein said first specialized switch comprises one or more computer processors.

6. The financial market data network of claim 1, wherein the overall latency in providing normalized financial market data to the one or more external consumers that is converted from the raw financial market data from the one or more external financial exchanges is lower than the overall latency of a financial market data network that utilizes a switching fabric between the one or more financial exchanges and a feed handler.

7. A system comprising:
first and second financial market data network switches, each of the first and second financial market data network switches comprising:
a plurality of I/O ports adapted to receive and send financial market data over a financial market data network, wherein at least a portion of the plurality of I/O ports are adapted for direct communications with an external financial exchange that provides raw financial market data;
a switching fabric situated within the switch and adapted to route financial market data communications within the switch and between various ports from the plurality of I/O ports;
a processor configured to:
receive the raw financial market data directly from the external financial exchange without the received raw financial market data first traveling through the switching fabric;
process the received raw financial market data into a normalized format before the financial market data is sent through the switching fabric;
route and send the normalized financial market data through the switching fabric; and
when the normalized data is acted upon:
receive a trade command based on the normalized financial market data;
route the trade command through the first switching fabric; and
forward the trade command to the one or more external financial exchanges without the trade command undergoing further processing within the first and second financial market data network switches;
wherein the first and second financial market data network switches are a pair of redundant financial market data network switches.

8. The system of claim 7, wherein the normalized financial market data is suitable for use by one or more external consumers without further processing of the financial market data.

9. The system of claim 7, wherein said processor is arranged to receive the raw financial market data after the data has passed through at least one of the plurality of I/O ports.

10. The switch system of claim 7, further comprising one or more computer processors.

11. The system of claim 7, further including:
one or more storage components adapted to hold information that facilitates the proper routing of normalized financial market data through the switching fabric.

12. The system of claim 11, wherein said information includes one or more network protocols, one or more layer tables, or any combination thereof.

13. The system of claim 7, wherein said financial market data network switch facilitates the realization of a reduced overall network latency in providing normalized financial market data to an external consumer that is converted from the raw financial market data from the external financial exchange.

14. The system of claim 7, wherein the financial market data network switch is adapted to be updated and reprogrammed using a remote updating process.

15. A method of providing communications over a financial market data network, the method comprising:
receiving, at first and second processors situated within first and second specialized financial market data network switches, respectively, a raw financial market data feed directly from an external financial exchange without the raw financial market data feed first traveling through any switching fabric;
processing, by the first and second processors, data from the raw financial market data feed into a normalized format before the financial market data is sent through any switching fabric, wherein the normalized financial market data is suitable for use by one or more external consumers without further processing of the financial market data;

routing, by the first and second processors, the normalized financial market data through respective switching fabrics after said processing step;

delivering the normalized financial market data to the one or more external consumers; and when the normalized data is acted upon:
   receiving a trade command based on the normalized financial market data;
   routing the trade command through the switching fabric; and
   forwarding the trade command to the one or more external financial exchanges without the trade command undergoing further processing within the first and second specialized financial market data network switches;

wherein the first and second specialized financial market data network switches are a pair of redundant specialized financial market data network switches.

16. The method of claim 15, wherein each of said first and second specialized financial market data network switches includes a plurality of I/O ports adapted for direct communications with the external financial exchange that provides raw financial market data.

17. The method of claim 15, wherein the overall latency in providing normalized financial market data to the one or more external consumers from the raw financial market data provided by the external financial exchange is lower than the overall latency of a financial market data network that utilizes a switching fabric between the financial exchange and a feed handler.

18. The financial market data network of claim 1, wherein the first specialized switch is adapted to be updated and reprogrammed using a remote updating process.

19. The financial market data network of claim 18, wherein the remote updating process includes updating the normalized format.

20. The system of claim 14, wherein the remote updating process includes updating the normalized format.

* * * * *